June 8, 1954 T. W. HOSKING 2,680,647
HEADLINER ASSEMBLY FOR AUTOMOBILE BODIES
Filed Dec. 8, 1950
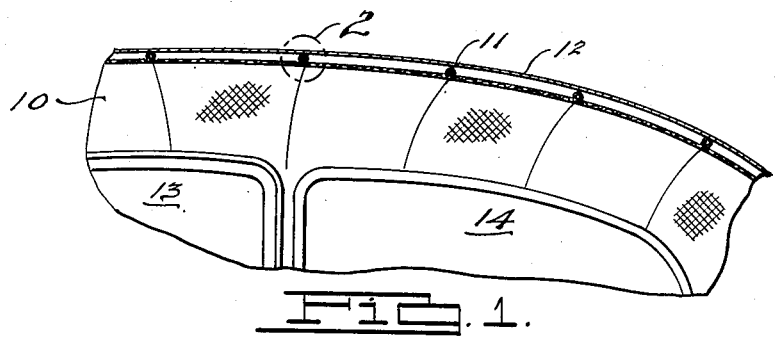
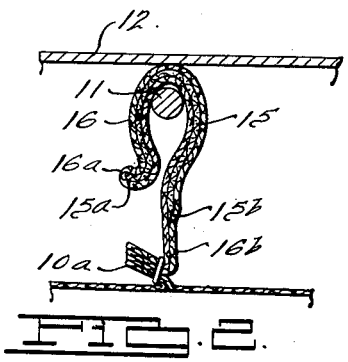
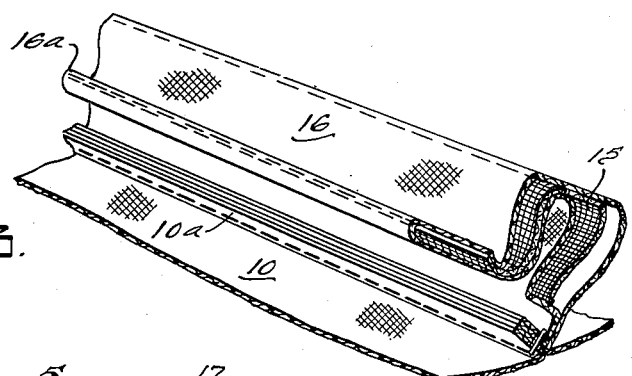
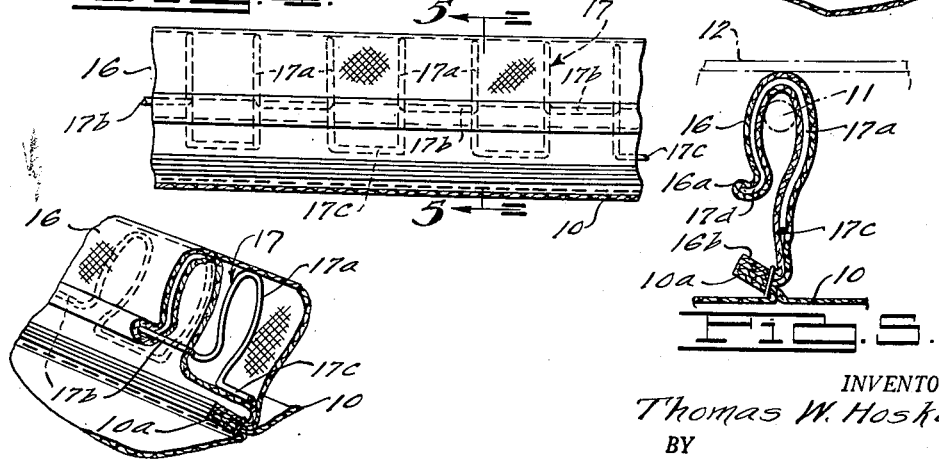
INVENTOR.
*Thomas W. Hosking.*
BY
*Elmer Jamison Gray*
ATTORNEY.

Patented June 8, 1954

2,680,647

UNITED STATES PATENT OFFICE 2,680,647

HEADLINER ASSEMBLY FOR AUTOMOBILE BODIES

Thomas W. Hosking, Detroit, Mich., assignor to Briggs Manufacturing Co., Detroit, Mich., a corporation of Michigan Application December 8, 1950, Serial No. 199,803

6 Claims. (Cl. 296—137)

This invention relates generally to headliners for vehicle bodies, and in particular to improved means for securing such headliners in place within the body.

Heretofore it has been the practice in trimming the interiors of automobile bodies to cover the underside of the roof with a cloth headliner extending overhead from front to rear of the body. In order to support the headlining material, it has been the usual practice to install a number of transverse top bows or cross bows beneath the roof panel at suitably spaced intervals and to support the headliner from the bows by means of transversely extending loops of cloth or so-called listing stitched to the headliner and having the bows passing therethrough. As a result of the conventional construction, it has been necessary to stitch the listing to the headliner and to thread the bows through the loops provided by the listing prior to installation thereof within the body, whereupon the bows with attached headliner were installed within the body. Such a procedure has been objectionable and costly since installation of the bows and attached headliner after completion of the body is awkward and time consuming.

It has accordingly been an important object of the present invention to provide improved means for attaching the headliner of a vehicle body to the cross bows, whereby the latter are feasibly installed within the body at the time of assembly and welding together of the body structural parts, and the headliner and attached listing are thereafter simply and quickly assembled within the body and secured to the installed cross bows.

Another object has been to provide an improved listing for a vehicle body comprising a suitable cloth or fabric strip adapted to be stitched along a lower edge to the headliner, the listing extending upward from said edge and terminating in a downturned edge so as to provide a downward opening loop or hook adapted to loop or hook over a cross bow from the side thereof, the upper portion of the listing being maintained in the loop shape by means of a resilient form preferably comprising a wire-formed reinforcement extending longitudinally of the listing and bonded thereto.

Another and more specific object is to provide an improved automobile body construction comprising a roof panel, with headliner and listing of the foregoing character, and a plurality of longitudinally spaced cross bows secured at their ends within the body, the upper portions of each bow intermediate its ends being adjacent but unconnected to the underside of the roof panel, the listing associated with each bow comprising a double thickness cloth strip enclosing and conforming closely to the contour of a resilient wire-formed reinforcement adapted to hold the strip in the shape of a downward opening channel-like hook portion extending longitudinally of the bow and hooked over the latter, the portions of the wire-formed reinforcement forming one channel-side of the strip being extended downward below the channel portion and the double thickness cloth enveloping the latter wire-formed portions being extended below the same and terminating in a flexible attachment tab extending longitudinally of the bow and suitably secured to the headliner, as by stitching, the two opposed layers of the cloth strip and interposed reinforcement being preferably bonded to each other so as to comprise a unitary laminated structure.

By virtue of such a construction, the cross bows may be feasibly installed permanently within the body during the assembly and welding together of its structural members, achieving simplicities and economies in construction and avoiding the necessity of installing the headliner and attached bows after the body is complete. The cross bows may be welded at their ends to the lateral portions of the body roof, if desired, leaving the intermediate portions of the cross bows accessible for hooking the listing thereover. Thereafter the completed body is conveyed to a trim department where the headliner is readily installed by hooking the reinforced channel-like or hook shaped portions of the listing over the cross bows within the body.

Other objects of this invention will appear in the following description and appended claims, reference being had to the accompanying drawings forming a part of this specification wherein like reference characters designate corresponding parts in the several views.

Fig. 1 is a fragmentary longitudinal vertical section through an automobile roof panel, showing the listing embodying the present invention suspended from the cross bows and supporting the headliner.

Fig. 2 is an enlarged view of the sectional portion enclosed within the circle 2 of Fig. 1.

Fig. 3 is a fragmentary perspective view showing the listing of Figs. 1 and 2 stitched to the headliner, portions of the outer cloth envelope of the listing being broken away to show the wire-formed reinforcement.

Fig. 4 is a fragmentary elevation showing another listing embodying the present invention and stitched to a headliner.

Fig. 5 is a section taken in the direction of the arrows substantially along the line 5—5 of Fig. 4, showing a cross bow in phantom.

Fig. 6 is a fragmentary perspective view showing the listing of Figs. 4 and 5 stitched to the headliner, portions of the outer cloth envelope of the listing being broken away to show the wire-formed reinforcement.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring particularly to Figs. 1–3, a particular embodiment of the present invention is illustrated by way of example supporting a head liner 10 from a number of transverse top bows or cross bows 11 mounted within a vehicle body, fragmentary portions of the body roof panel 12 and glazed windows 13 and 14 being shown in Fig. 1. In this construction, the several cross bows 11 are suitably secured at their ends within the body, the intermediate portions of each bow 11 being free of the roof panel 12 for reasons which will be apparent below.

As illustrated particularly in Figs. 2 and 3, the listing associated with each cross bow 11 comprises a wire screen or mesh 15 formed to provide a channel of inverted U-section extending longitudinally of the cross bow. The downward opening channel mouth of the mesh 15 is somewhat constricted in the present instance and one lower edge thereof is flared outward to provide a rounded lower lip 15a. The other lower edge of the mesh 15 extends directly downward from the channel mouth and terminates at 15b at a level below the lip 15a. The entire mesh 15 is enveloped between two layers of cloth conforming closely to the opposite sides thereof and comprising in the present instance a single cloth strip 16 doubled on itself along a fold 16a at the edge of the lip 15a and extending longitudinally thereof. The two opposed longitudinal edges of the cloth strip 16 extend downward side by side beyond the edge 15b of the mesh to provide an attachment tab 16b and are suitably secured to a corresponding tab or gathered together portion 10a of the headliner 10 in accordance with customary practice, as for example by stitching.

As a result of the headliner and listing combination described above, the cross bows 11 are conveniently installed as aforesaid in the body during the assembly and welding of its structural metal parts. Thereafter the body is conveyed to a trim department whereat the headliner 10 with attached listing 15, 16 is installed in the body by hooking the inverted channel portions of the latter over the cross bows 11 as indicated in Fig. 2. In this regard, the two folded together layers of the cloth 16 and interposed mesh 15 are preferably bonded together so as to provide a unitary laminated structure and to facilitate its handling and application in assembly and hooking over the cross bows. Likewise, the mesh 15 preferably comprises resilient stock having sufficient strength and rigidity to support the installed and tautly drawn headliner 10, being adapted to fold and bend with the headliner 10 as required to install the latter and thereafter to return to its desired original channel or hook-like shape. The rounded lip 15a not only serves as a bead reinforcing the corresponding edge of the mesh 15, but also serves to guide the bow 11 into the channel mouth of the listing 15, 16 when the latter is installed.

Another embodiment of the present invention is illustrated in Figs. 4–6 comprising the cloth envelope 16 enclosing a wire-formed reinforcement indicated generally by the numeral 17. In this case, a single length of resilient wire stock is convoluted longitudintlly of the strip or envelope 16 so as to provide a number of generally parallel vertical legs 17a spaced longitudinally of the strip 16. The ends of the adjacent legs 17a are joined alternately above and below respectively by transverse wire portions 17b and 17c, Figs. 4 and 6.

The upper ends of each alternate pair of adjacent legs 17a joined by the transverse wire portion 17b are rolled downward to comprise a downward opening loop or hook portion of generally inverted U-section, Fig. 5, adapted to hook over a cross bow 11 as discussed above, and then slightly upward to provide a rounded outturned lip 17d comparable to the lip 15a of Fig. 2.

Each upper transverse wire portion 17b lies adjacent and parallel to the upper fold 16a. The two lower edges of the strip 16 extend below the transverse wire portions 17c to comprise the attachment tab 16b, which is stitched to a tab or fold of the headliner 10 as aforesaid. Also the two layers of the cloth strip 16 are preferably bonded to each other intermediate the wire portions of the reinforcement 17 and at the region of the tab 16b so as to complete a unitary laminated hook-like structure and to facilitate its handling and installation.

I claim:

1. In a listing adapted to support a vehicle body headliner from a transverse top bow, a thin flexible strip adapted to extend longitudinally of the bow and having a lower edge adapted to be secured to the headliner, a wire formed reinforcement extending longitudinally of the upper portion of the strip and bonded thereto above said edge, the reinforced upper portion of the strip comprising a downward opening channel adapted to hook over the bow.

2. In a listing adapted to support a vehicle body headliner from a transverse top bow, a thin flexible strip adapted to extend longitudinally of the bow and having a lower edge adapted to be secured to the headliner, a wire formed reinforcement extending longitudinally of the upper portion of the strip and bonded thereto above said edge, the reinforced upper portion of the strip comprising a downward opening channel adapted to hook over the bow, the reinforcement for one side of the channel extending downward below the other side and the portion of the strip comprising said first channel side extending downward below the reinforcement and terminating in said lower edge.

3. In a listing adapted to support a vehicle body headliner from a transverse top bow, a layered strip comprising throughout its length a resilient wire mesh layer bonded between two layers of flexible material and formed to provide a downward opening channel adapted to extend longitudinally of the bow and to hook over the latter, the two flexible layers comprising one side of the channel extending downward beyond the lowermost edge of the interposed wire mesh and terminating in a flexible attachment tab extending longitudinally of the strip and adapted for attachment with the headliner.

4. In a vehicle body construction having a roof panel and a transverse top bow underlying the panel and separable therefrom along the intermediate upper portions of the bow, a headliner comprising a flexible sheeting covering interior portions of the roof panel, listing comprising a strip of flexible sheet material secured along a lower edge to the headliner and extending longitudinally of the bow, and wire formed reinforcing means conforming closely to the upper portions of the strip and secured thereto, the upper portions of the strip and attached reinforcing means comprising a downward opening channel adapted to be hooked over the bow to support the headliner.

5. In a vehicle body construction having a roof panel and a transverse top bow underlying the panel and separable therefrom along the intermediate upper portions of the bow, a headliner comprising a flexible sheeting covering interior portions of the roof panel, listing comprising a flexible fabric strip doubled on itself along an upper edge adapted to extend longitudinally of the bow, the strip being secured along a lower edge to the headliner, and means to hold the strip in the form of a downward opening channel adapted to be hooked over the bow comprising a resilient wire formed reinforcement extending the length of the strip and interposed between the two layers thereof and bonded thereto.

6. In a vehicle body construction having a transverse top cross bow underlying the roof panel and separable therefrom along intermediate parts of the bow and also having a flexible headliner sheeting adapted to cover interior portions of the roof panel, means for removably supporting said sheeting from said bow comprising a resilient wire-formed downward opening channel form adapted to extend transversely of said sheeting and to be removably hooked over said bow, and means adapted to extend transversely of said sheeting for securing the same to said channel form comprising a fabric attachment strip depending from one side of said channel form and having an upper portion conforming to the shape of said channel form and enclosing the latter and bonded thereto.

References Cited in the file of this patent

UNITED STATES PATENTS

| Number | Name | Date |
|---|---|---|
| 1,521,030 | McGhee | Dec. 30, 1924 |
| 1,714,885 | Moss | May 28, 1929 |
| 1,741,946 | Markee | Dec. 31, 1929 |
| 2,185,004 | Trussell | Dec. 26, 1939 |
| 2,418,918 | Yankus | Apr. 15, 1947 |

OTHER REFERENCES

Ser. No. 377,449, Tandetzke (A. P. C.), published May 25, 1943.